United States Patent
Nakata et al.

(10) Patent No.: US 6,335,507 B1
(45) Date of Patent: Jan. 1, 2002

(54) LASER-BEAM MACHINING METHOD, LASER-BEAM MACHINING DEVICE AND AUXILIARY TOOL FOR PIERCING

(75) Inventors: Yoshinori Nakata; Atsushi Mori; Tadashi Kurosawa, all of Minamitsuru-gun (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/401,942

(22) Filed: Sep. 23, 1999

(30) Foreign Application Priority Data

Oct. 12, 1998 (JP) .......................................... 10-318344

(51) Int. Cl.[7] .............................................. B23K 26/00
(52) U.S. Cl. ........................... 219/121.67; 219/121.84; 219/121.7
(58) Field of Search ........................ 219/121.67, 121.7, 219/121.78, 121.75, 121.84, 121.63

(56) References Cited

U.S. PATENT DOCUMENTS

| | | | | |
|---|---|---|---|---|
| 3,749,878 A | * | 7/1973 | Sullivan et al. | 212/121 L |
| 5,434,383 A | * | 7/1995 | Nakata et al. | 219/121.71 |
| 5,607,606 A | * | 3/1997 | Mori et al. | 219/121.67 |
| 6,118,097 A | * | 9/2000 | Kaga et al. | 219/121.84 |

FOREIGN PATENT DOCUMENTS

| | | |
|---|---|---|
| JP | 62-158593 | 7/1987 |
| JP | 63-52792 | 3/1988 |
| JP | 2-284780 | 11/1990 |
| JP | 4-70282 | 6/1992 |
| JP | 4-200891 | 7/1992 |
| JP | 5-185261 | 7/1993 |
| JP | 6-142972 | 5/1994 |
| JP | 9-136177 | 5/1997 |
| JP | 9-192871 | 7/1997 |
| JP | 9-271980 | 10/1997 |
| JP | 10-318344 | 2/1998 |
| JP | 10-113784 | 5/1998 |
| JP | 10-137970 | 5/1998 |
| JP | 10225787 | 8/1998 |
| JP | 10-305387 | 11/1998 |
| JP | 11-141822 | 5/1999 |
| JP | 11-314189 | 11/1999 |

* cited by examiner

Primary Examiner—M. Alexandra Elve
(74) Attorney, Agent, or Firm—Staas & Halsey LLP

(57) ABSTRACT

A piercing nozzle (2) having a nozzle hole (2a) larger than the diameter of a converged laser beam (10) and smaller than the diameter of a hole (1a) of a cutting nozzle (1) is in use. Further, an underlay (3) having a hole (3a) at a position corresponding to the nozzle hole (2a) is placed under the piercing nozzle (2) through a clearance (5). Piercing is carried out by irradiating the laser beam (10) to a machining target (6) through nozzle holes (1a, 2a) and (3a) on condition that a laser oscillator is set to output high power. The diameter of a hole machined by the piercing is small, and less scattered dross is produced. The scattered dross is cooled down within the clearance (5) and is then dropped down to the underlay (3), so that the adhesion of the scattered dross to the machining target does not occur. Since a small hole is machined with the high power, the machining time for piercing is remarkably shortened.

2 Claims, 4 Drawing Sheets

FIG. 1
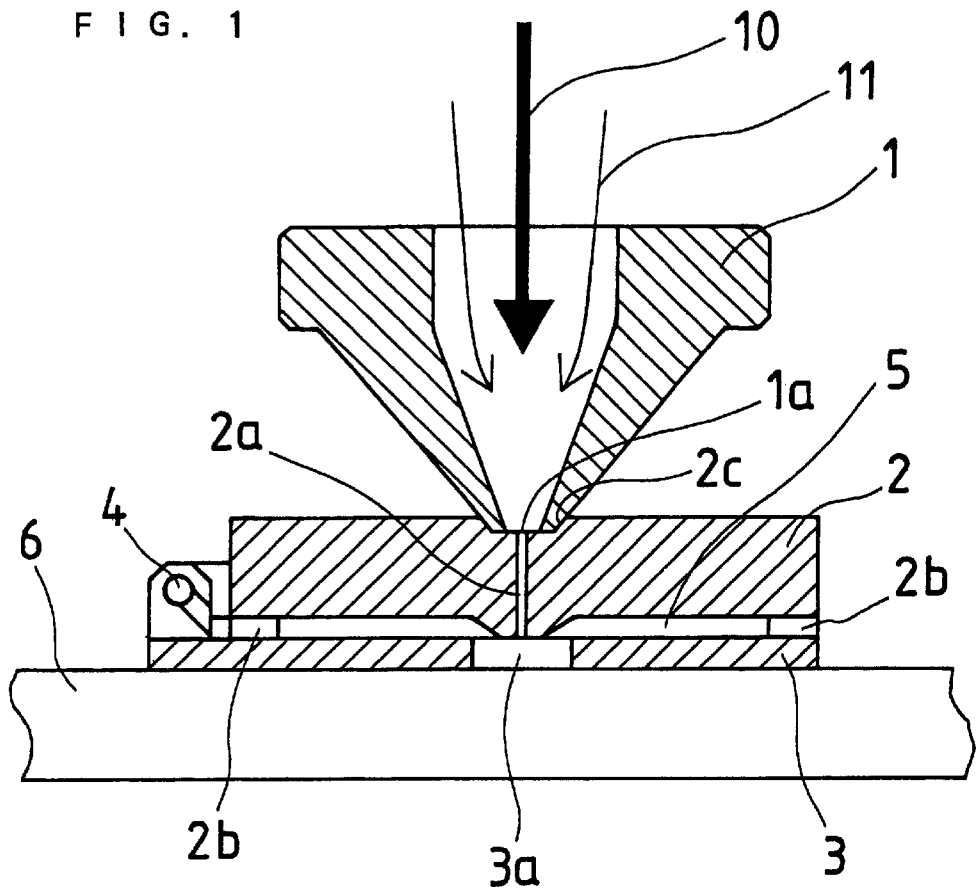
FIG. 2A
FIG. 2B
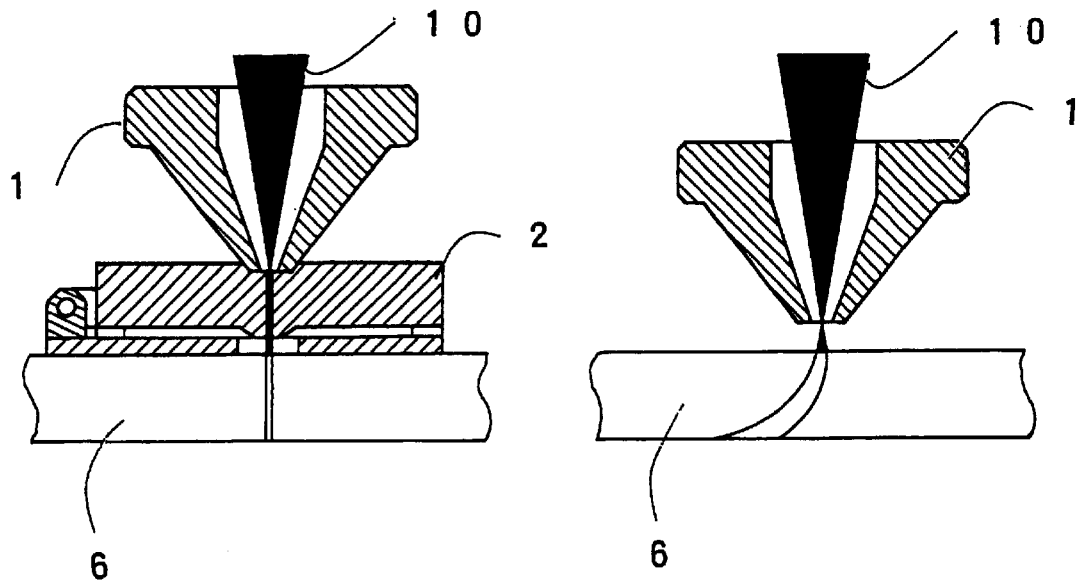

LASER-BEAM MACHINING METHOD, LASER-BEAM MACHINING DEVICE AND AUXILIARY TOOL FOR PIERCING

BACKGROUND OF THE INVENTION

1. Field of the Invention

This invention relates to a laser-beam machining method and a laser-beam machining device for carrying out machining to pierce a cutting target such as a steel sheet.

2. Description of the Prior Art

In a laser-beam machining method of cutting a machining target such as a steel sheet by irradiating a laser beam outputted from a laser oscillator to the machining target in a converged state through a nozzle having a small hole, piercing work or boring work is required at the starting time of machining.

A serious problem faced by the piercing is the presence of scattered dross. Since boring of a machining target such as steel sheet or the like is carried out by melting the machining target by laser beam while jetting assist gas through the nozzle, scattering of dross resulting from melting the machining target by the laser beam occurs due to the assist gas jetted through the nozzle. There is a danger that the scattered dross may be adhered to the nozzle to damage the nozzle or be adhered to an operator to burn the operator. Further, the scattered dross adhered to the surface of the machining target hinders the subsequent machining for the machining target.

For preventing a nozzle from being damaged due to the scattered dross, there are known methods such as a method of making a nozzle of a metal of a high melting point material and that of placing a nozzle largely apart from a machining target only at the time of piercing (See Japanese Patent Applications Laid-open Nos. 63-52792 and 4-200891).

In addition, for the purpose of ensuring the safety of an operator, there are known methods such as a method of covering a machining point to prevent the dross from being scattered at the time of piercing and that of controlling the scattering direction of dross (See Japanese Patent Applications Laid-open Nos. 9-136177, 10-137970, 6-142972 and 10-225787).

However, according to the above methods, the scattered dross is adhered to the surface of the machining target, resulting in the hindrance of the subsequent cutting. In this connection, for the purpose of preventing the scattered dross from adhering to the surface of the machining target, there is disclosed a method of shielding a machining point to collect the dross in Japanese Patent Application Laid-open No. 9-271980. However, this method is supposed to be used in association with piercing based on pulse output which is determined in advance in terms of such size and quantity of scattered dross as will enable the scattered dross to be absorbed and collected (See Japanese Patent Application Laid-open No. 5-185261).

Recently, the improvement on a laser oscillator for higher power has been made, and such improvement brings about a tendency toward increasing of the thickness of a steel sheet serving as a machining target. When such a steel sheet of a large thickness is subjected to piercing based on pulse output as described above, there is a problem in that it takes a long time to carry out the piercing. On the contrary, if piercing is carried out with laser power of continuous output, as in the case of normal cutting, and also at its maximum level, the piercing can be completed quickly. However, in this case, a large quantity of dross will be produced disadvantageously, resulting in the occurrence of adhesion of such dross in the shape of a lump to the surface of the machining target. On the other hand, if piercing is carried out with laser power of low continuous output, it will take a long time to carry out the piercing and adhesion will occur disadvantageously.

OBJECTS AND SUMMARY OF THE INVENTION

An object of the present invention is to provide a laser-beam machining method, a laser-beam machining device and an auxiliary tool for piercing which permit piercing at high speed.

Another object of the present invention is to provide a laser-beam machining method, a laser-beam machining device and an auxiliary tool for piercing which may prevent dross from being scattered, resulting in no occurrence of adhesion of the dross to a machining target.

According to the present invention, a nozzle having a hole diameter (i.e., a nozzle having a hole diameter of not more than 2.5 mm) larger than a converged laser beam diameter and smaller than a hole diameter of a cutting nozzle is used as a piercing nozzle. Further, the piercing is carried out on condition that an underlay formed by a metal sheet having a hole in the center is placed on the machining target, so that the underlay is permitted to catch the scattered dross so as to prevent the dross from adhering to the surface of the machining target.

Further, the piercing nozzle is connected to the tip of the cutting nozzle at the time of piercing, for the reason that the piercing carried out using a cutting nozzle having a relatively small hole diameter may shorten the time taken for the piercing and may cause less scattering of the dross, in comparison with the piercing carried out using a cutting nozzle having a relatively large hole diameter. In addition, the piercing nozzle is mounted to the cutting nozzle detachably or is mounted to be movable between a piercing position and a shunting position.

A clearance for cooling down the scattered dross is provided between the piercing nozzle and the underlay. There are also provided a blade driven in the clearance to remove the scattered dross from the surface of the underlay and a scattered dross removing means to remove the scattered dross by flowing gas or a fluid into the clearance.

Further, the piercing nozzle added to the cutting nozzle and the underlay are provided in a pair as an auxiliary tool for piercing.

BRIEF DESCRIPTION OF THE DRAWINGS

The foregoing and other objects and features of the invention will become apparent from the following description of preferred embodiments of the invention with reference to the accompanying drawings, in which:

FIG. 1 is a sectional view showing an essential part of a nozzle portion of a laser-beam machining device according to the first embodiment of the present invention, in which a combination of a piercing nozzle and an underlay is joined to a cutting nozzle;

FIG. 2A is a view showing the laser-beam machining device of FIG. 1, which is carrying out piercing;

FIG. 2B is a view showing the cutting nozzle of FIG. 2A which is carrying out normal for a cutting target, with the piercing nozzle and the underlay removed from the laser-beam machining device of FIG. 2A;

DETAILED DESCRIPTION OF THE PREFERRED EMBODIMENTS

Figure 3A:
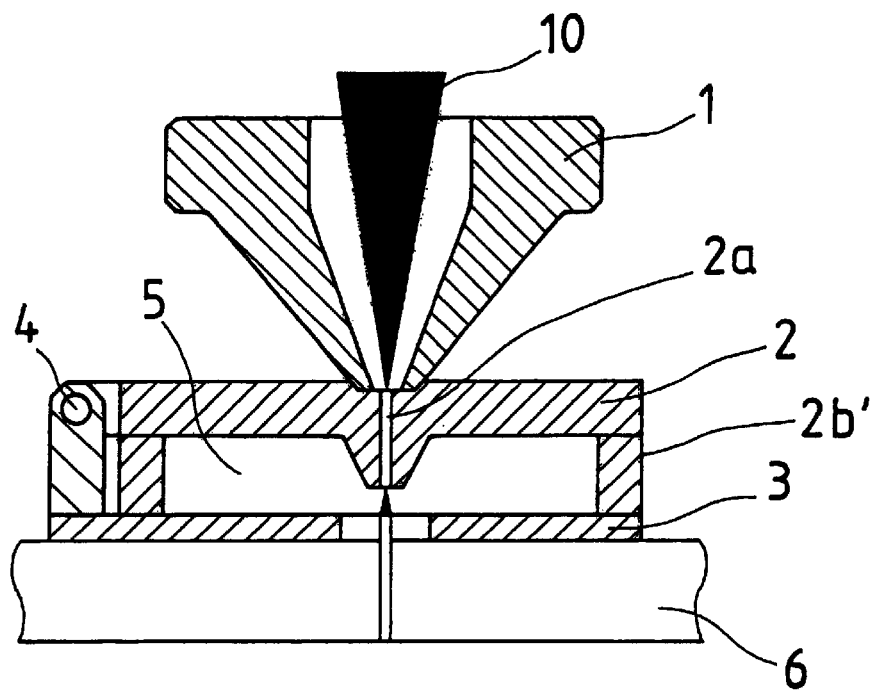
FIG. 3A is a sectional view showing an essential part of a nozzle portion of a laser-beam machining device according to the second embodiment of the present invention, in which a combination of a piercing nozzle and an underlay is joined to a cutting nozzle.

A description will now be given of a laser-beam machining device according to the first embodiment of the present invention with reference to FIG. 1.

The laser-beam machining device comprises a cutting nozzle 1 normally used for cutting a machining target and a piercing nozzle 2 used in combination with the cutting nozzle 1 for piercing. Further, a pivotal portion 4 is provided on one end of the piercing nozzle 2, and an underlay 3 is mounted to the piercing nozzle 2 through the pivotal portion 4 so that it can rotate relative to and can be detached from the piercing nozzle 2.

Further, a spacer 2b is provided in a projected state at four corners of the lower surface (i.e., the surface opposite to the surface brought into engagement with the cutting nozzle 1) of the piercing nozzle 2, so that when the underlay 3 is placed on the side of the piercing nozzle 2, a clearance 5 is formed between the piercing nozzle 2 and the underlay 3, as shown in FIG. 1.

The underlay 3 is used to prevent scattered dross from adhering to the surface of a machining target 6 at the time of piercing. The underlay 3 has a hole 3a in the center. When carrying out piercing, the underlay 3 is placed in a manner such that the hole 3a and a hole 2a of the piercing nozzle 2 overlap with each other, in particular, in a manner such that the center of the hole 3a of the underlay 3 is placed in alignment with the center of the hole 2a of the piercing nozzle 2.

The upper surface of the piercing nozzle 2 has a tapered fitting hole 2c, to which the tip of the cutting nozzle 1 is capable of being fitted. The tip of the cutting nozzle 1 has a nozzle hole 1a in the center. Further, the piercing hole 2a is formed to extent from the center of the tapered fitting hole 2c to the lower surface of the piercing nozzle 2.

Thus, when the tip of the cutting nozzle 1 is fitted to the tapered fitting hole 2c of the piercing nozzle 2, the center of the nozzle hole 1a at the tip of the cutting nozzle 1, the center of the piercing hole 2a and the center of the hole 3a of the underlay 3 are placed in alignment with a common axis, as shown in FIG. 1.

When carrying out piercing for the machining target 6, a laser beam 10 passes through the nozzle hole 1a at the tip of the cutting nozzle 1, the piercing hole 2a and the hole 3a of the underlay 3 and then reaches the machining target 6.

The underlay 3 needs to have a size enough to cover the scattering range of the dross caused by the piercing. In this embodiment, a flat sheet in the shape of a square of 60 mm×60 mm with a thickness of 3 mm is in use, and its material is the same copper alloy as the piercing nozzle 2.

Further, if the hole 3a formed in the underlay 3 is too large, the scattered dross will adhere to the surface of the machining target 6 at a portion corresponding to the hole 3a, and therefore, it is better to form the hole 3a as small as possible. However, if the hole 3a is too small, it will take a longer time disadvantageously to carry out piercing on account of reduction in an area of the part of machining target 6 where the assist gas 11 strikes, and so on.

Thus, a suitable size of the hole 3a of the underlay 3, which is larger than the hole 2a of the piercing nozzle 2, is found by an experiment or the like. According to this embodiment, since the diameter of the hole 2a of the piercing nozzle 2 is set to 1.5 mm as will be described later, the hole 3a of the underlay 3 is formed to have a diameter of about 5 mm. Further, the clearance 5 between the underlay 3 and the piercing nozzle 2 is set to 3 mm.

Since the piercing nozzle 2 is used for catching scattered dross above the underlay 3, its size is set to be substantially equal to that of the underlay 3.

Further, the nozzle hole 2a of the piercing nozzle 2 is formed to be smaller in diameter than the nozzle hole 1a of the cutting nozzle 1. If the nozzle hole 2a has a larger diameter, an area of the part of machining target 6 where the assist gas 11 jetted through the nozzle hole 2a strikes is increased and injection speed of the assist gas is reduced, in comparison with the case where the nozzle hole 2a has a smaller diameter with the assist gas 20 supplied under the same pressure. Thus, if diameter of the nozzle hole 2a is increased, the force for scattering the dross of the machining target melted in the process of piercing is reduced, bringing about a delay of scattering, with the result that the diameter of a hole formed by piercing increases and scattered dross increases in quantity.

On the other hand, if the nozzle hole 2a has a smaller diameter, the injection speed is increased and an area of the part of machining target 6 where the assist gas 11 strikes is reduced, in comparison with the case where the nozzle hole 2a has a larger diameter with the assist gas 11 supplied under the same pressure. Thus, if diameter of the nozzle hole 2a is decreased, the force for scattering the dross of the machining target melted in the process of piercing is increased, bringing about quick scattering of the dross caused by the irradiation of the laser beam 10, with the result that the diameter of a hole machined by the piercing decreases and scattered dross decreases in quantity.

In view of the above, the nozzle hole 2a of the piercing nozzle 2 preferably needs to have a diameter larger than the diameter of converged laser beam 10 and smaller than the nozzle hole 1a of the cutting nozzle 1.

In this connection, according to this embodiment, since the nozzle hole 1a of the cutting nozzle 1 has a diameter of 4 mm, and the laser beam 10 has a converged spot diameter of about 0.8 mm, the nozzle hole 2a of the piercing nozzle 2 is formed to have a diameter of 1.5 mm (larger than 0.8 mm and smaller than 4 mm). Further, the length of the hole 2a of the piercing nozzle 2, which has diameter of 1.5 mm, is set to 10 mm. In piercing using this piercing nozzle 2, it is ascertained that it does not matter if the laser beam is reflected from the inner wall of the piercing nozzle 2.

A description will now be given of the operation to carry out the machining to pierce the machining target by using the laser-beam machining device according to this embodiment.

First, the cutting nozzle 1 is put above a target position for machining to pierce the machining target 6. Subsequently, the tapered fitting hole 2c of the piercing nozzle 2 is fitted to the tip of the cutting nozzle 1 to combine the cutting nozzle 1 with the piercing nozzle 2 and the underlay 3. Then, the cutting nozzle 1, the piercing nozzle 2 and the underlay 3 are moved down in a combined state toward a piercing position on the machining target 6 such that the underlay 2 is placed on the surface of the machining target 6 as shown in FIG. 1.

After the completion of the positioning described above, the laser oscillator (not shown) is activated to irradiate the converged laser beam 10 to the machining target 6 through the hole 1a of the cutting nozzle 1, the hole 2a of the piercing nozzle 2 and the hole 3a of the underlay 3 (see FIG. 2A), while the injection of the assist gas 11 to the machining target 6 is carried out through the holes 1a, 2a and 3a. Thereupon, the portion of the machining target 6, irradiated by the laser beam 10, starts melting. Then, the resultant dross is removed from the machining target 6 by high-speed and high-pressure assist gas 11 jetted through the small-diameter nozzle hole 2a of the piercing nozzle 2.

On the other hand, the assist gas 11 is turned in a reverse direction after striking against the machining target 6 and is then exhausted from the hole 3a of the underlay 3 to the outside through the clearance 5 between the piercing nozzle 2 and the underlay 3, while the dross carried by the assist gas 11 is cooled down in the course of the passage through the clearance 5 and is then dropped down to the underlay 3, resulting in the adhesion of the dross to the underlay 3.

As described above, according to the embodiment, since the assist gas 11 is jetted at high speed under high pressure to a narrow area of the machining target 6 through the small nozzle hole 2a of the piercing nozzle 2, the dross is removed from the machining target 6 at high speed, so that the laser beam 10 is allowed to melt the inner part of the machining target 6. As a result, with an increase in machining speed for piercing, a hole machined by the piercing decreases in diameter, and the scattered dross also decreases in quantity.

After the completion of the piercing as described above, the piercing nozzle 2 and the underlay 3 are removed from the cutting nozzle 1 to start the normal cutting with the cutting nozzle 1 (refer to FIG. 2B).

On the other hand, the piercing nozzle 2 and the underlay 3, having been removed from the cutting nozzle 1, is put in a ready state for the next piercing after opening the piercing nozzle 2 through the pivotal motion relative to the underlay 3 about the pivotal portion 4 or separating the underlay 3 from the piercing nozzle 2 and then scraping off the adhered dross from the underlay 3.

A description will now be given of a laser-beam machining device according to the second embodiment of the present invention with reference to FIGS. 3A and 3B.

According to the second embodiment, a cover 2b' is formed at the edge of the piercing nozzle 2, so that when the piercing nozzle 2 is placed opposite to the underlay 3, the cover 2b' serves as a spacer to form a clearance 5 of a predetermined depth between the piercing nozzle 2 and the underlay 3, and also to define the sectional shape of the clearance 5.

Figure 3B:
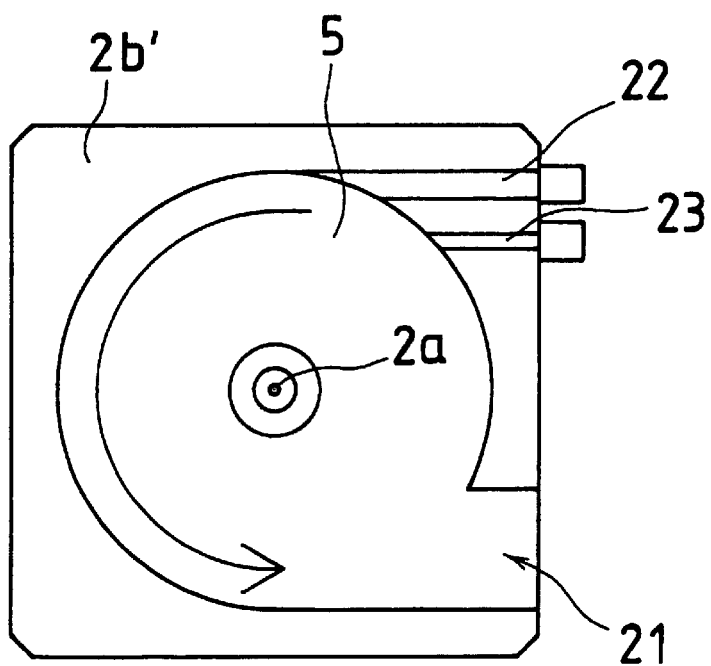
FIG. 3B is a view showing the piercing nozzle of FIG. 3A, as viewed from the bottom, after the removal of the underlay placed below the piercing nozzle.

FIG. 3B is a view showing the piercing nozzle 2 of FIG. 3A, as viewed from the bottom, after the removal of the underlay 3 placed below the piercing nozzle 2. As shown in FIG. 3B, the clearance 5 has a substantially circular sectional shape. The cover 2b' has three paths (a path leading to an exhaust port 21, a path leading to an inlet port 22 and a path leading to an injection port 23) which are formed in a parallel arrangement to permit the communication between the clearance 5 and the outside of the piercing nozzle 2.

The assist gas 11 in the clearance 5 is exhausted to the outside through the exhaust port 21. A fluid such as compressed air is supplied from the outside into the clearance 5 through the inlet port 22. Oil, a soap solution or a surface active solution is jetted or sprayed from the outside into the clearance 5 through the injection port 23.

When carrying out piercing, the compressed air supplied into the clearance 5 through the inlet port 22 flows along the inner surface of the clearance 5 of the circular sectional shape to form a swirl flow and is then exhausted through the exhaust port 21. In this process, the dross scattered by the assist gas 11 is cooled down by the compressed air and is then exhausted through the exhaust port 21. Since the dross is cooled down by the compressed air before being exhausted through the exhaust port 21 as described above, the quantity of dross adhered to the surface of the underlay 3, which is exhausted through the exhaust port 21 and then dropped down to the underlay 3, is decreased. Incidentally, a fluid (gas or liquid) other than the compressed air may be supplied through the inlet port 22.

Further, since the scattered dross is covered and then cooled down with oil, soap solution or surface active solution which has been jetted into the clearance 5 through the injection port 23, the dross dropped down to the underlay 3 after having been cooled down is hardly adhered to the underlay 3, and as a result, is exhausted through the exhaust port 21 together with the compressed air supplied through the inlet port 22.

In consequence, the piercing nozzle 2 and the underlay 3 may be used for a long time without being cared for. Further, even if the dross is adhered to the underlay 3, it is possible to easily remove the adhered dross from the underlay 3 by enclosing the adhered dross with the oil, the soap solution or the surface active solution.

As described above, according to the second embodiment, since the scattered dross in the clearance 5 is cooled down by the compressed air and also by oil, soap solution or surface active solution and is thereafter exhausted through the exhaust port 21 while being carried on the swirl flow of the compressed air, the scattered dross seldom continue to accumulate in the clearance 5. Thus, the laser-beam machining device according to the second embodiment may carry out the piercing continuously without frequent operation for removing the dross.

Figure 4A:
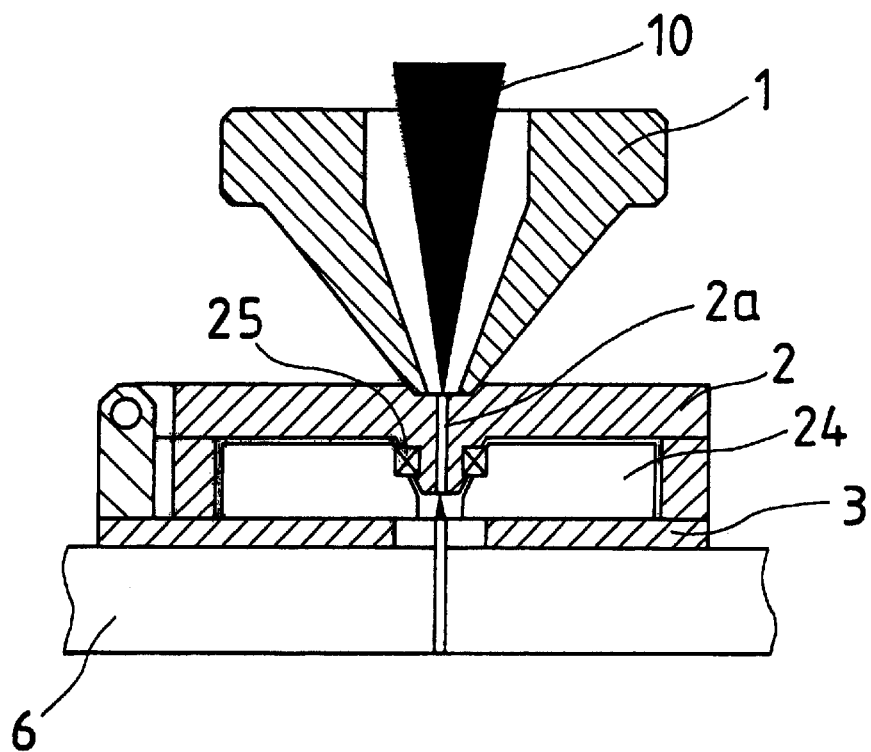
FIG. 4A is a sectional view showing an essential part of a nozzle portion of a laser-beam machining device according to the third embodiment of the present invention, in which a combination of a piercing nozzle and an underlay is joined to a cutting nozzle.
Figure 4B:
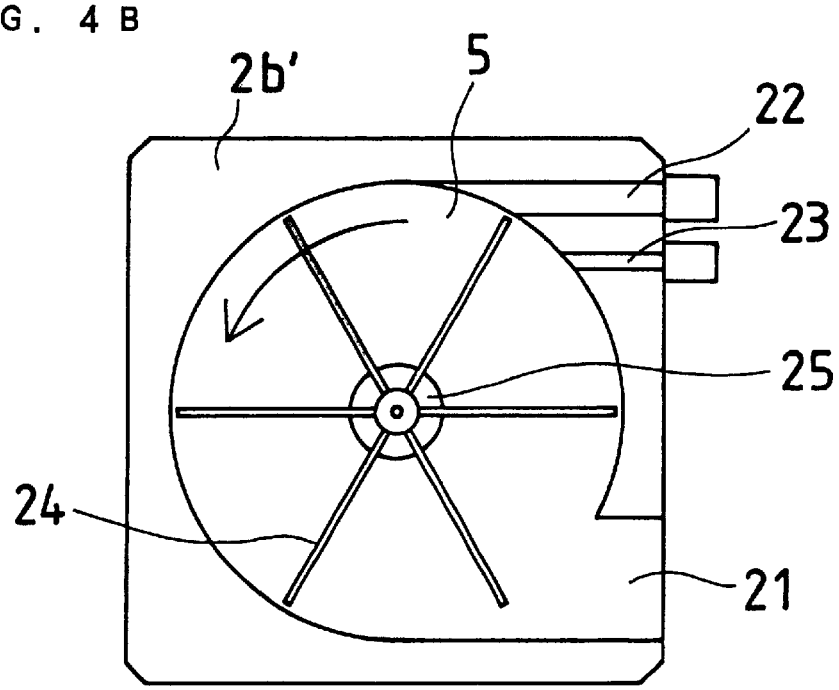
FIG. 4B is a view showing the piercing nozzle of FIG. 4A, as viewed from the bottom, after the removal of the underlay placed below the piercing nozzle.

A description will now be given of a laser-beam machining device according to the third embodiment with reference to FIGS. 4A and 4B.

The laser-beam machining device according to the third embodiment is equivalent to a laser-beam machining device having a plurality of blades 24 (six blades in the embodiment shown in FIG. 4B) provided in a rotatable state in the clearance 5 of the laser-beam machining device according to the second embodiment.

These blades 24 are mounted on the piercing nozzle 2 at the center portion thereof (a portion surrounding the nozzle hole 2a) through a ball bearing 25 so that they can rotate. More specifically, as shown in FIG. 4A, a cylindrical projection projecting toward the clearance 5 is formed in the center of the piercing nozzle 2, and an inner race of the ball bearing 25 is fixed to the projection. On the other hand, these six blades 24 are fixed to the outer race of the ball bearing 25.

These blades 24 are rotated by the compressed air supplied into the clearance 5 through the inlet port 22 in the course of piercing. Thus, dross caused by irradiation of the laser beam 10 and then scattered by the assist gas 11 is carried toward the exhaust port 21 together with the assist gas through the rotation of the blades 24 while being cooled down by the compressed air and is then exhausted through the exhaust port 21. Further, even if the dross dropped down to the underlay 3 tends to be adhered thereto, the rotating blades 24 carry the dross toward the exhaust port 21 after having scraped off from the underlay 3, and the dross is exhausted through the exhaust port 21.

As described above, when carrying out piercing using the laser-beam machining device according to the third embodiment, since the dross is forcibly exhausted by the blades 24, the dross can not accumulate in the clearance 5, so that it is possible to carry out piercing continuously. Further, since the dross is not allowed to adhere and accumulate on the underlay 3, there is no need to frequently clean the underlay 3.

In the laser-beam machining device according to the second embodiment, the underlay 3 and the piercing nozzle 2 are connected together pivotally through the pivotal means (the pivotal portion 4). In the laser-beam machining device according to the third embodiment, a fixing means such as a set screw is used to connect the underlay 3 and the piercing nozzle 2 together.

In the laser-beam machining device according to the third embodiment as described above, the compressed air is supplied into the clearance 5 through the inlet port 22. But as a modification of the third embodiment, fluid such as compressed air need not be supplied through the inlet port 22, or the inlet port 22 for supplying the fluid need not be formed in the cover 2b' of the piercing nozzle 2.

According to the above modification, the assist gas 11 jetted at high speed under high pressure toward the machining target 6 is turned in the reverse direction after striking against the machining target 6 and then flows into the clearance 5 between the piercing nozzle 2 and the underlay 3, while the assist gas 11 in the clearance 5 forms a swirl flow and is then exhausted to the outside through the exhaust port 21 serving as the only outlet. The swirl flow of the assist gas 11 causes the rotation of the blades 24. Thus, even in this modification, since the dross adhered to the underlay 3 may be scraped off from the underlay through the rotation of the blades 24, the laser-beam machining device according to this modification may display the substantially similar functions to those of the laser-beam machining device according to the third embodiment shown in FIGS. 4A and 4B.

In any of laser-beam machining device according to the first, second and third embodiments, connection of the piercing nozzle 2 to the cutting nozzle 1 is carried out only by fitting the tip of the cutting nozzle 1 to the tapered fitting hole 2a of the piercing nozzle 2 without any special attaching mechanism used.

Figure 5:
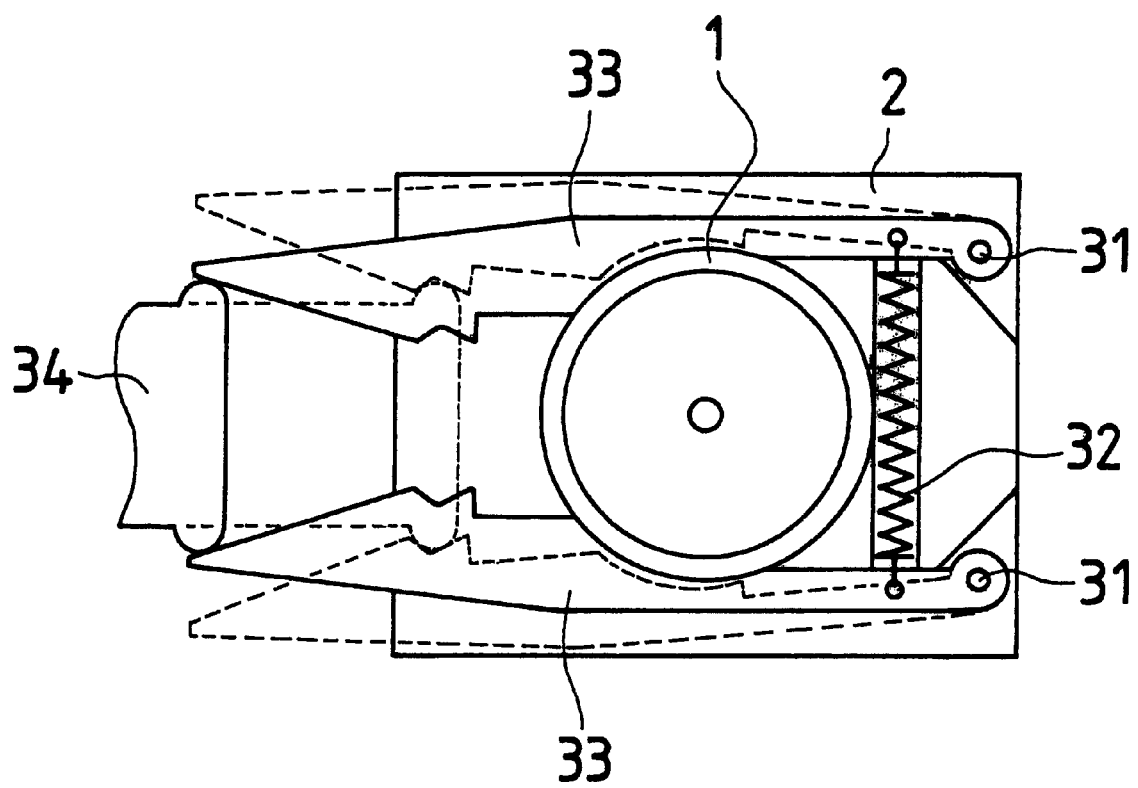
FIG. 5 is a view for explaining a mounting mechanism provided on a laser-beam machining device according to the fourth embodiment of the present invention to detachably mount a piercing nozzle and an underlay to a cutting nozzle.

A description will now be given of a laser-beam machining device having an attaching mechanism which is used for mounting a combination of the piercing nozzle 2 and the underlay 3 on the cutting nozzle 1, as the fourth embodiment, with reference to FIG. 5. FIG. 5 is a view of the cutting nozzle 1 mounted with the piercing nozzle 2 through the attaching mechanism, as viewed from the top. It should be noted that the piercing nozzle 2 mounted with the attaching mechanism as will be described later and the underlay 3 connected to this piercing nozzle 2 have the same structure as those of the laser-beam machining device according to the first, second and third embodiments.

The outer surface of the cutting nozzle 1 has a groove to which a pair of clips 33 (which will be described later) constituting a mounting mechanism are fitted.

On the other hand, a pair of shafts 31 are provided in a projected state on one side of the upper surface (i.e., the surface on the side opposite to the cutting nozzle 1) of the piercing nozzle 2, and the bases of the clips 33 are respectively mounted to the shafts 31 in a pivotal state. Further, a spring 32 is provided between these two clips 33, and these two clips 33 are energized to come close to each other by means of the spring 32.

Each clip 33 has a tapered end, and a distance between the inner edge of one clip 33 and the inner edge of the other clip 33 gradually widens toward the ends of the clips. Then, when a removing member 34 is pressed against the ends of the clips 33 and is then pushed toward the cutting nozzle 1, the pair of clips 33 are expanded against the force of the spring 32 as shown by a broken line of FIG. 5.

The tip of the cutting nozzle 1 is fitted to the tapered fitting hole 2c of the piercing nozzle 2 with the clips 33 expanded by the removing member 34, and thereafter, the removing member 34 is removed from the clips. Thereupon, the energizing force of the spring 32 acts on the pair of clips 32 to cause them to come close to each other, so that these clips 32 are kept fitted to the groove formed in the cutting nozzle 1. As a result, the cutting nozzle 1 and the combination of the piercing nozzle 2 with the underlay 3 are connected together in one body through the attaching mechanism.

In this connection, when an assembly of the cutting nozzle 1 and combination of the piercing nozzle 2 and the underlay 3, connected with each other through the attaching mechanism in one body, is moved to the piercing position, the cutting nozzle 1, the piercing nozzle 2 and the underlay 3 are simultaneously placed at the piercing position.

In the case of starting normal cutting after completion of piercing, the removing member 34 is firstly pushed against the ends of the clips 33 to expand the clips 33 as shown by the broken line of FIG. 5. Thereupon, since the clips 33 are slipped out of the groove formed on the cutting nozzle 1, the piercing nozzle 2 and the underlay 3 connected thereto can be removed from the cutting nozzle 1.

As described above, according to the fourth embodiment, the combination of the piercing nozzle 2 and the underlay 3 can be mounted to or detached from the cutting nozzle 1. However, as a modification of this embodiment, the combination of the piercing nozzle 2 and the underlay 3 may be kept always mounted to the cutting nozzle 1 or a machining head, for mounting the cutting nozzle 1 in a manner such that the combination can move relative to the cutting nozzle 1. For instance, a mounting tool (not shown) is attached to the laser-beam machining head which mounts the cutting nozzle 1 so that it can move relative to the cutting nozzle 1, and then the combination of the piercing nozzle 2 and the underlay 3 is mounted to the mounting tool. Then, the mounting tool is operated to selectively place the combination of the piercing nozzle 2 and the underlay 3 at a position where the piercing nozzle 2 comes into engagement with the cutting nozzle 1 (during piercing works) and a position where the piercing nozzle 2 is placed distant from the cutting nozzle 1 (during normal cutting).

The following table 1 shows the results of experiment made under the conditions that a carbon dioxide gas laser oscillator of 3 kW was used to carry out piercing for a mild steel sheet having a thickness of 25 mm through the injection of oxygen assist gas.

TABLE 1

|  | Piercing based on pulse output | | Piercing by means of cutting nozzle (based on continuous output) | Piercing according to the invention (based on continuous output) |
| --- | --- | --- | --- | --- |
|  | (a) | (b) | | |
| Nozzle hole diameter (mm) | 3.0 | 1.5 | 3.0 | 1.5 |
| Assist gas pressure (kgf/cm$^2$) | 0.3 | 1.0 | 0.3 | 1.0 |
| Oscillator power (kW) | 3 | 3 | 3 | 3 |
| Output frequency of oscillator (Hz) | 10 | 10 | — | — |
| Duty ratio (%) | 30 | 30 | 100 | 100 |
| Machined hole diameter (mm) | 1.5 | 1.5 | 20–30 | 6 |
| Machining time (sec) | 30 | 25 | 3 | 0.8 |

In the above table 1, according to "piercing based on pulse output" two kinds of experiments (a) and (b), different in nozzle hole diameter from each other, were made. The piercing in the experiment (a) was carried out under the conditions where a normal cutting nozzle having a hole diameter of 3.0 mm was used, and the pressure of assist gas was set to 0.3 kgf/cm$^2$. The power of the laser oscillator was set to 3 kW at its maximum, and the output frequency of the oscillator and the duty ratio were respectively set to 10 Hz and 30%. As the result of the piercing carried out under the above conditions, a piercing hole having a diameter of 1.5 mm was produced in the machining time of 30 seconds.

On the other hand, the piercing in the experiment (b) was carried out under the same conditions as the experiment (a), except that a nozzle having a hole diameter of 1.5 mm was used, and the pressure of the assist gas was set to 1.0 kgf/cm$^2$. As a result, a piercing hole having a diameter of 1.5 mm was produced in 25 seconds.

In the experiment on "piercing by means of the cutting nozzle", the piercing was carried out under the conditions where a cutting nozzle having a hole diameter of 3.0 mm was used, the pressure of the assist gas was set to 0.3 kgf/cm$^2$ and the power of the laser oscillator was set to 3 kW at its maximum based on continuous output. As a result, the piercing was completed in 3 seconds, while the diameter of a machined hole was as large as 20 to 30 mm.

In the experiment on "piercing according to the invention", the piercing was carried out under the conditions that a nozzle having a hole diameter of 1.5 mm was used, the pressure of the assist gas was set to 1.0 kgf/cm$^2$ and the power of the laser oscillator was set to 3 kW at its maximum based on a continuous output. As a result, a piercing hole having a diameter of 6 mm was produced in 0.8 seconds.

As is apparent from the table 1, the piercing according to the invention enables a hole having a smaller diameter to be formed in a shorter machining time, as compared with piercing by means of the cutting nozzle.

In addition, when the piercing according to the invention is compared with the conventional piercing based on pulse output, it is found that a hole of a smaller diameter can be machined by the conventional piercing based on pulse output, while the machining time can be remarkably shortened by the piercing according to the invention. In particular, the fact that the machining time for piercing is remarkably as short as 0.8 seconds in the case of the invention as shown in the table 1 results in that the time required for conduction of heat, which is produced when the machining target at the piercing position is melted by the laser beam 10, to the other area is remarkably shortened. For that reason, it is supposed that a piercing hole having a diameter of 6 mm, not so large, can be formed.

The following tables 2 and 3 respectively show the results of the experiments when the cutting and the piercing were carried out with nozzles of various diameters.

TABLE 2

Power of 3 kw, SS400 material with thickness of 19 mm

| Nozzle diameter (mm) | 0.5 | 1.0 | 1.5 | 2.0 | 2.5 | 3.0 | 4.0 | 5.0 |
| --- | --- | --- | --- | --- | --- | --- | --- | --- |
| Cutting | No good | No good | No good | Defective, Adhesion of dross | Defective, Defective in cutting plane | Good | Good | No good |
| Piercing (sec) | 6 | 3 | <1 | <1 | <1 | <1 | <1 | <1 |
| Machined hole diameter (mm) | 3 | 4 | 6 | 8 | 10 | Defective | Defective | Defective |

TABLE 3

Power of 6 kw, SS400 material with thickness of 25 mm

| Nozzle diameter (mm) | 0.5 | 1.0 | 1.5 | 2.0 | 2.5 | 3.0 | 4.0 | 5.0 |
|---|---|---|---|---|---|---|---|---|
| Cutting | Beam diameter is too large | No good | No good | No good | Defective, Adhesion of dross | Defective, Defective in cutting plane | Good | Good |
| Piercing (sec) | | 3 | <1 | <1 | <1 | <1 | <1 | <1 |
| Machined hole diameter (mm) | | 4 | 6 | 8 | 10 | Defective | Defective | Defective |

The table 2 shows the results of the experiment applied to a mild steel sheet (SS400 material) having a thickness of 19 mm by the use of a carbon dioxide gas laser oscillator of 3 kW The table 3 shows the results of the experiment applied to a soft steel sheet (SS400 material) having a thickness of 25 mm by the use of a carbon dioxide gas laser oscillator of 6 kW. The machining was carried out with the assist gas pressure of 1.0 kgf/cm$^2$ and based on continuous output of laser oscillator. Since the machining time for piercing and the hole diameter are subject to variation, the numerical values in the tables 2 and 3 are given as their mean values.

As is apparent from the above tables 2 and 3, the use of a nozzle having a hole diameter of not less than 3.0 mm results in defective piercing, for the reasons that the diameter of a machined hole is made too large, so that a large quantity of dross is scattered and is then adhered to the machining target, resulting in the hindrance of the subsequent cutting, and that a portion around the machining point is heated up to a high temperature to excess, so that the machining target is placed in an overheated state in the subsequent cutting to bring about the abnormal burning, that is, "self burning".

In view of the above, it is to be desired that the nozzle for piercing should have a hole diameter larger than the diameter of converged laser beam but not exceeding about 2.5 mm. Further, as is apparent from the tables 2 and 3, when the nozzle having a hole diameter in the range from 1.5 to 2.5 mm is in use, the machining time for piercing is below 1 second, and the diameter of a machined hole is in the range from 6 to 10 mm.

On the other hand, when the hole diameter of the nozzle is changed from 1.5 to 1.0 mm, the machining time for piercing is largely subject to variation from below 1 (<1) to 3 seconds (the diameter of a machined hole is also subject to variation from 6 to 4 mm).

In view of the above, it may be said that a nozzle having a hole diameter of about 1.5 mm is suitable for the piercing.

The above description has been given of the embodiments in which the piercing nozzle 2 and the underlay 3 are used in a pair, however, it is to be understood that piercing may be carried out only by using the piercing nozzle without the need for an underlay. The piercing in this case inevitably has a defect in that the dross is adhered to the surface of the machining target, while there is an advantage in that the piercing may be carried out for a short period of time. In addition, since a hole having a small diameter is machined by the piercing in this case, dross is small in quantity, with the result that adhesion of the dross to the machining target is advantageously small.

On the other hand, the piercing may be carried out only by using the underlay 3 without the need for the piercing nozzle 2. In this case, the piercing by using only the underlay may be applied to the conventional piercing to advantageously prevent the dross from adhering to the surface of the machining target.

Further, the above description has been given of the embodiments in which the piercing nozzle 2 is attached to the cutting nozzle 1, however, a laser-beam machining device having an automatic nozzle exchanging device capable of automatically exchanging a nozzle mounted to the laser-beam machining head may be used for the piercing. In his case, a cutting nozzle and a piercing nozzle are placed in advance in the automatic nozzle exchanging device. When carrying out the piercing, the piercing nozzle is automatically mounted to the laser-beam machining head according to a command from a control device such as a numerical control unit operated by the input of an NC program. And after completion of the piercing, the cutting nozzle is automatically mounted to the laser-beam machining head.

As described above, according to the present invention, piercing may be carried out for a short period of time to machine a hole having a small diameter, and the quantity of scattered dross is decreased. The underlay may be used to catch the scattered dross to prevent the dross from adhering to the surface of the machining target. Further, the scattered dross dropped down to the underlay may be forcibly removed to enable continuous piercing.

What is claimed is:

1. A laser-beam machining device including an automatic nozzle exchanging means for automatically exchanging a nozzle to be mounted to a mounting head for carrying out machining to pierce or cut a machining target by irradiating a laser beam outputted from a laser oscillator to the machining target in a converged state through a nozzle hole, and simultaneously jetting assist gas through said nozzle hole, comprising:

a cutting nozzle; and a piercing nozzle having a hole diameter not exceeding 2.5 mm which is larger than a converged laser beam diameter but smaller than a hole diameter of said cutting nozzle;

wherein the piercing is carried out by mounting said piercing nozzle to the machining head by means of said automatic nozzle exchanging means at the time of piercing.

2. A laser-beam machining device according to claim 1, wherein it further comprises an underlay formed by a metal sheet having a hole, and said underlay is combined with said piercing nozzle at the time of piercing such that the center of the hole of said underlay is in alignment with the center of the hole of said piercing nozzle.

* * * * *

UNITED STATES PATENT AND TRADEMARK OFFICE
CERTIFICATE OF CORRECTION

PATENT NO.   : 6,335,507 B1                                                                        Page 1 of 1
DATED          : January 1, 2002
INVENTOR(S) : Yoshinori Nakata et al.

It is certified that error appears in the above-identified patent and that said Letters Patent is hereby corrected as shown below:

<u>Title page,</u>
Item [75], delete "-gun".
Item [30], change "October 12, 1998" to -- October 21, 1998 --.
Item [56], delete "A", all occurrences.

<u>Column 5,</u>
Line 8, change "2" to -- 3 --.
Line 19, change "la" to --1a --.

<u>Column 11,</u>
Line 22, after "kW", insert -- . --.

Signed and Sealed this

Sixth Day of August, 2002

Attest:

Attesting Officer

JAMES E. ROGAN
*Director of the United States Patent and Trademark Office*